(12) United States Patent
Nair et al.

(10) Patent No.: US 9,461,890 B1
(45) Date of Patent: Oct. 4, 2016

(54) DELEGATION OF DATA MANAGEMENT POLICY IN AN INFORMATION MANAGEMENT SYSTEM

(75) Inventors: Manoj Nair, Cary, NC (US); Stephen R. Perrin, Chapel Hill, NC (US)

(73) Assignee: EMC CORPORATION, Hopkinton, MA (US)

( * ) Notice: Subject to any disclaimer, the term of this patent is extended or adjusted under 35 U.S.C. 154(b) by 87 days.

(21) Appl. No.: 11/864,770

(22) Filed: Sep. 28, 2007

(51) Int. Cl.
*H04L 12/24* (2006.01)
*H04L 29/08* (2006.01)

(52) U.S. Cl.
CPC ........... *H04L 41/5003* (2013.01); *H04L 67/16* (2013.01)

(58) Field of Classification Search
CPC ... H04L 41/5003; H04L 67/16; H04L 41/12; H04L 41/5009; H04L 63/20; H04L 41/0893; Y10S 707/99931; Y10S 707/99942
See application file for complete search history.

(56) References Cited

U.S. PATENT DOCUMENTS

| | | | |
|---|---|---|---|
| 6,003,040 A | 12/1999 | Mital et al. | |
| 6,167,445 A * | 12/2000 | Gai et al. | 709/223 |
| 6,182,075 B1 | 1/2001 | Hsu | |
| 6,308,216 B1 | 10/2001 | Goldszmidt et al. | |
| 6,349,297 B1 | 2/2002 | Shaw et al. | |
| 6,363,053 B1 | 3/2002 | Schuster et al. | |
| 6,430,613 B1 | 8/2002 | Brunet et al. | |
| 6,591,300 B1 | 7/2003 | Yurkovic | |
| 6,633,312 B1 | 10/2003 | Rochford et al. | |
| 6,829,745 B2 * | 12/2004 | Yassin | G06F 17/2247 715/236 |
| 6,865,728 B1 | 3/2005 | Branson et al. | |
| 7,028,312 B1 * | 4/2006 | Merrick et al. | 719/330 |
| 7,185,073 B1 | 2/2007 | Gai et al. | |
| 7,240,076 B2 | 7/2007 | McCauley et al. | |
| 7,278,156 B2 | 10/2007 | Mei et al. | |
| 7,363,292 B2 | 4/2008 | Chaboche | |
| 7,412,518 B1 * | 8/2008 | Duigou et al. | 709/227 |
| 7,433,304 B1 | 10/2008 | Galloway et al. | |
| 7,543,020 B2 | 6/2009 | Walker et al. | |
| 7,548,915 B2 | 6/2009 | Ramer et al. | |
| 7,565,324 B2 | 7/2009 | Vincent | |
| 7,565,656 B2 | 7/2009 | Yamasaki et al. | |
| 7,580,357 B2 | 8/2009 | Chang et al. | |
| 7,613,806 B2 | 11/2009 | Wright et al. | |

(Continued)

FOREIGN PATENT DOCUMENTS

EP 1855218 A2 11/2007
WO WO 2008/036621 3/2008

OTHER PUBLICATIONS

U.S. Appl. No. 11/692,051, filed Mar. 27, 2007, Perrin et al.

(Continued)

*Primary Examiner* — Polina Peach
(74) *Attorney, Agent, or Firm* — Workman Nydegger

(57) ABSTRACT

In an information management system operating in a networked computing environment, a method for delegating at least one data management process to an intelligent service provider connected via a network to the information management system, comprising associating data objects in the computing environment with one or more categories of data objects, providing a series of logic and rules to the intelligent service provider, the logic and rules pertaining to categories of data objects and one or more actions to be executed for the data objects based on the categories of data objects, and receiving reporting information from the intelligent service provider indicating that the one or more actions have been successfully executed.

21 Claims, 8 Drawing Sheets

(56) References Cited

U.S. PATENT DOCUMENTS

| | | | |
|---|---|---|---|
| 7,616,642 B2 | 11/2009 | Anke et al. | |
| 7,640,345 B2 | 12/2009 | Nair et al. | |
| 7,676,798 B2 | 3/2010 | Snover et al. | |
| 7,725,570 B1 | 5/2010 | Lewis | |
| 7,725,571 B1 | 5/2010 | Lewis | |
| 7,730,172 B1 | 6/2010 | Lewis | |
| 7,734,765 B2 | 6/2010 | Musman et al. | |
| 7,739,239 B1 | 6/2010 | Cormie et al. | |
| 7,895,220 B2 | 2/2011 | Evans et al. | |
| 7,953,740 B1 | 5/2011 | Vadon et al. | |
| 8,069,435 B1 | 11/2011 | Lai | |
| 8,104,080 B2 | 1/2012 | Burns et al. | |
| 8,548,964 B1 | 10/2013 | Nair et al. | |
| 8,620,724 B2 | 12/2013 | Adhiraju et al. | |
| 2002/0016800 A1 | 2/2002 | Spivak et al. | |
| 2002/0091746 A1 | 7/2002 | Umberger et al. | |
| 2002/0120685 A1 | 8/2002 | Srivastava et al. | |
| 2002/0161883 A1 | 10/2002 | Matheny et al. | |
| 2003/0023587 A1 | 1/2003 | Dennis et al. | |
| 2003/0023712 A1 | 1/2003 | Zhao et al. | |
| 2003/0036886 A1 | 2/2003 | Stone | |
| 2003/0041050 A1 | 2/2003 | Smith et al. | |
| 2003/0093528 A1 | 5/2003 | Rolia | |
| 2003/0140009 A1 | 7/2003 | Namba et al. | |
| 2003/0167180 A1 | 9/2003 | Chung et al. | |
| 2003/0196108 A1 | 10/2003 | Kung | |
| 2003/0200357 A1* | 10/2003 | Yanosy | G06F 9/44 719/328 |
| 2003/0212778 A1 | 11/2003 | Collomb | |
| 2003/0225829 A1 | 12/2003 | Pena et al. | |
| 2003/0233391 A1 | 12/2003 | Crawford, Jr. et al. | |
| 2003/0233464 A1 | 12/2003 | Walpole et al. | |
| 2003/0234815 A1* | 12/2003 | Delaney | G06F 17/30873 715/762 |
| 2003/0236904 A1 | 12/2003 | Walpole et al. | |
| 2004/0060002 A1 | 3/2004 | Lucovsky et al. | |
| 2004/0098415 A1* | 5/2004 | Bone et al. | 707/200 |
| 2004/0133876 A1 | 7/2004 | Sproule | |
| 2004/0215650 A1 | 10/2004 | Shaji et al. | |
| 2004/0236660 A1 | 11/2004 | Thomas et al. | |
| 2004/0243699 A1 | 12/2004 | Koclanes et al. | |
| 2005/0060662 A1 | 3/2005 | Soares et al. | |
| 2005/0071182 A1 | 3/2005 | Aikens et al. | |
| 2005/0091346 A1* | 4/2005 | Krishnaswami | G06F 9/44505 709/220 |
| 2005/0102297 A1 | 5/2005 | Lloyd et al. | |
| 2005/0125768 A1 | 6/2005 | Wong et al. | |
| 2005/0132034 A1 | 6/2005 | Iglesia et al. | |
| 2005/0177545 A1 | 8/2005 | Buco et al. | |
| 2005/0197852 A1* | 9/2005 | Gebhard et al. | 705/1 |
| 2005/0235342 A1 | 10/2005 | Ene-Pietrosanu et al. | |
| 2005/0251533 A1 | 11/2005 | Harken et al. | |
| 2005/0262097 A1 | 11/2005 | Sim-Tang et al. | |
| 2005/0273451 A1 | 12/2005 | Clark et al. | |
| 2005/0289216 A1 | 12/2005 | Myka et al. | |
| 2006/0015388 A1 | 1/2006 | Flockhart et al. | |
| 2006/0036463 A1 | 2/2006 | Patrick et al. | |
| 2006/0039364 A1 | 2/2006 | Wright | |
| 2006/0092861 A1* | 5/2006 | Corday et al. | 370/256 |
| 2006/0095543 A1 | 5/2006 | Ito et al. | |
| 2006/0095570 A1 | 5/2006 | O'Sullivan | |
| 2006/0101084 A1 | 5/2006 | Kishi et al. | |
| 2006/0106782 A1* | 5/2006 | Blumenau et al. | 707/3 |
| 2006/0112108 A1 | 5/2006 | Eklund et al. | |
| 2006/0114832 A1 | 6/2006 | Hamilton et al. | |
| 2006/0129415 A1* | 6/2006 | Thukral et al. | 705/1 |
| 2006/0129974 A1* | 6/2006 | Brendle et al. | 717/108 |
| 2006/0179143 A1 | 8/2006 | Walker et al. | |
| 2006/0236061 A1 | 10/2006 | Koclanes | |
| 2006/0248165 A1 | 11/2006 | Sridhar et al. | |
| 2006/0248187 A1* | 11/2006 | Thorpe et al. | 709/224 |
| 2007/0033273 A1* | 2/2007 | White et al. | 709/223 |
| 2007/0038683 A1 | 2/2007 | Dixon et al. | |
| 2007/0055689 A1 | 3/2007 | Rhoads et al. | |
| 2007/0058632 A1 | 3/2007 | Back et al. | |
| 2007/0061363 A1 | 3/2007 | Ramer et al. | |
| 2007/0070894 A1 | 3/2007 | Wang et al. | |
| 2007/0083875 A1 | 4/2007 | Jennings | |
| 2007/0094392 A1* | 4/2007 | Stone | D04B 1/26 709/225 |
| 2007/0103984 A1* | 5/2007 | Kavuri et al. | 365/185.17 |
| 2007/0104208 A1 | 5/2007 | Svensson | |
| 2007/0127370 A1 | 6/2007 | Chang et al. | |
| 2007/0153802 A1 | 7/2007 | Anke et al. | |
| 2007/0162749 A1* | 7/2007 | Lim | 713/167 |
| 2007/0192352 A1 | 8/2007 | Levy | |
| 2007/0208751 A1 | 9/2007 | Cowan et al. | |
| 2007/0214208 A1* | 9/2007 | Balachandran | 709/201 |
| 2007/0226228 A1 | 9/2007 | Her et al. | |
| 2007/0260640 A1 | 11/2007 | Hamilton et al. | |
| 2007/0294209 A1 | 12/2007 | Strub et al. | |
| 2007/0294406 A1 | 12/2007 | Suer et al. | |
| 2007/0299828 A1 | 12/2007 | Lewis et al. | |
| 2008/0002678 A1 | 1/2008 | Klessig et al. | |
| 2008/0005086 A1 | 1/2008 | Moore | |
| 2008/0021850 A1 | 1/2008 | Irle et al. | |
| 2008/0049642 A1 | 2/2008 | Gudipudi et al. | |
| 2008/0059387 A1* | 3/2008 | Vaidhyanathan et al. | 705/500 |
| 2008/0071726 A1 | 3/2008 | Nair et al. | |
| 2008/0071727 A1 | 3/2008 | Nair et al. | |
| 2008/0071813 A1 | 3/2008 | Nair et al. | |
| 2008/0077682 A1 | 3/2008 | Nair et al. | |
| 2008/0077995 A1* | 3/2008 | Curnyn | 726/27 |
| 2008/0097923 A1 | 4/2008 | Kim et al. | |
| 2008/0114725 A1 | 5/2008 | Indeck et al. | |
| 2008/0134043 A1 | 6/2008 | Georgis et al. | |
| 2008/0177994 A1 | 7/2008 | Mayer | |
| 2008/0243900 A1 | 10/2008 | Yohanan et al. | |
| 2008/0301760 A1 | 12/2008 | Lim | |
| 2009/0064185 A1* | 3/2009 | Araujo | 719/315 |
| 2009/0077210 A1 | 3/2009 | Musman et al. | |
| 2009/0150431 A1 | 6/2009 | Schmidt et al. | |
| 2009/0157881 A1 | 6/2009 | Kavuri et al. | |
| 2010/0191577 A1 | 7/2010 | Lu et al. | |
| 2010/0250497 A1 | 9/2010 | Redlich et al. | |
| 2013/0110810 A1 | 5/2013 | Eidesen et al. | |

OTHER PUBLICATIONS

U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell II.
U.S. Appl. No. 11/772,192, filed Jun. 30, 2007, Nair et al.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/864,774, filed Sep. 28, 2007, Nair et al.
U.S. Appl. No. 11/528,783, Jan. 15, 2010, Office Action.
U.S. Appl. No. 11/528,772, Sep. 12, 2008, Pre-Interview First Office Action.
U.S. Appl. No. 11/528,772, Dec. 22, 2008, First Action Interview.
U.S. Appl. No. 11/528,772, Jun. 3, 2009, Final Office Action.
U.S. Appl. No. 11/528,772, Jan. 28, 2010, Office Action.
U.S. Appl. No. 11/528,783, Nov. 7, 2008, Pre-Interview First Office Action.
U.S. Appl. No. 11/528,783, Feb. 24, 2009, Office Action.
U.S. Appl. No. 11/528,783, Jun. 25, 2009, Final Office Action.
U.S. Appl. No. 11/692,058, Jan. 8, 2010, Final Office Action.
U.S. Appl. No. 11/528,898, Sep. 5, 2008, Pre-Interview First Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,898, Oct. 7, 2009, Final Office Action.
U.S. Appl. No. 11/528,900, Jun. 9, 2008, Office Action.
U.S. Appl. No. 11/528,900, Jan. 23, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/864,596, Nov. 12, 2009, Office Action.

(56) References Cited

OTHER PUBLICATIONS

U.S. Appl. No. 11/694,753, Mar. 25, 2009, Office Action.
U.S. Appl. No. 11/694,753, Nov. 18, 2009, Final Office Action.
U.S. Appl. No. 11/694,783, Feb. 6, 2009, Office Action.
U.S. Appl. No. 11/692,051, Aug. 26, 2009, Office Action.
U.S. Appl. No. 11/692,051, Feb. 19, 2010, Notice of Allowance.
U.S. Appl. No. 11/694,764, Jan. 28, 2010, Office Action.
U.S. Appl. No. 11/772,179, Aug. 19, 2009, Office Action.
U.S. Appl. No. 11/772,179, Feb. 23, 2010, Final Office Action.
U.S. Appl. No. 11/864,760, Nov. 24, 2009, Office Action.
U.S. Appl. No. 11/864,605, Jan. 14, 2010, Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/528,790, Jul. 12, 2010, Office Action.
U.S. Appl. No. 11/692,051, Mar. 31, 2010, Notice of Allowance.
U.S. Appl. No. 11/692,058, Jul. 6, 2010, Office Action.
U.S. Appl. No. 11/694,753, Mar. 29, 2010, Office Action.
U.S. Appl. No. 11/694,764, Aug. 4, 2010, Final Office Action.
U.S. Appl. No. 11/772,192, Apr. 15, 2010, Office Action.
U.S. Appl. No. 11/864,596, May 26, 2010, Final Office Action.
U.S. Appl. No. 11/864,605, May 28, 2010, Final Office Action.
U.S. Appl. No. 11/864,760, Apr. 7, 2010, Final Office Action.
U.S. Appl. No. 11/864,760, Jul. 27, 2010, Office Action.
U.S. Appl. No. 11/694,753, Oct. 5, 2010, Final Office Action.
U.S. Appl. No. 11/772,192, Oct. 29, 2010, Final Office Action.
U.S. Appl. No. 11/864,605, Nov. 4, 2010, Office Action.
U.S. Appl. No. 11/528,772, Mar. 3, 2011, Office Action.
U.S. Appl. No. 11/528,790, Jan. 13, 2011, Final Office Action.
U.S. Appl. No. 11/692,058, Jan. 24, 2011, Notice of Allowance.
U.S. Appl. No. 11/694,753, Jan. 19, 2011, Office Action.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,760, Jan. 27, 2011, Final Office Action.
U.S. Appl. No. 11/864,764, Jan. 27, 2011, Office Action.
U.S. Appl. No. 13/414,512, filed Mar. 7, 2012, Nair et al.
U.S. Appl. No. 11/528,783, Feb. 14, 2012, Office Action.
U.S. Appl. No. 11/528,898, Mar. 1, 2012, Office Action.
U.S. Appl. No. 11/772,179, Mar. 29, 2012, Office Action.
U.S. Appl. No. 11/864,764, May 3, 2012, Office Action.
U.S. Appl. No. 11/528,783, Aug. 15, 2012, Final Office Action.
U.S. Appl. No. 11/528,790, Jul. 18, 2012, Final Office Action.
U.S. Appl. No. 11/694,753, Nov. 30, 2012, Notice of Allowance.
U.S. Appl. No. 11/694,764, Aug. 1, 2012, Office Action.
U.S. Appl. No. 11/772,192, Jun. 12, 2012, Final Office Action.
U.S. Appl. No. 11/864,605, Jul. 3, 2012, Office Action.
U.S. Appl. No. 11/694,753, Jun. 17, 2011, Final Office Action.
U.S. Appl. No. 11/864,764, Aug. 29, 2011, Final Office Action.
U.S. Appl. No. 11/864,774, May 11, 2011, Office Action.
U.S. Appl. No. 11/528,772, Oct. 27, 2011, Notice of Allowance.
U.S. Appl. No. 11/528,790, Jan. 23, 2012, Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,192, Jan. 5, 2012, Office Action.
U.S. Appl. No. 11/864,596, Oct. 7, 2011, Final Office Action.
U.S. Appl. No. 11/864,774, Dec. 9, 2011, Final Office Action.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Jun. 17, 2013, Office Action.
U.S. Appl. No. 11/528,898, Oct. 2, 2012, Final Office Action.
U.S. Appl. No. 11/694,753, Aug. 31, 2012, Notice of Allowance.
U.S. Appl. No. 11/694,764, Nov. 29, 2012, Final Office Action.
U.S. Appl. No. 11/694,764, May 21, 2013, Notice of Allowance.
U.S. Appl. No. 11/772,179, Nov. 13, 2012, Final Office Action.
U.S. Appl. No. 11/772,179, Oct. 11, 2013, Office Action.
U.S. Appl. No. 11/772,192, Aug. 12, 2013, Notice of Allowance.
U.S. Appl. No. 11/864,605, Nov. 8, 2012, Final Office Action.
U.S. Appl. No. 11/864,605, May 24, 2013, Notice of Allowance.
U.S. Appl. No. 11/864,764, Dec. 10, 2012, Final Office Action.
U.S. Appl. No. 11/864,774, Apr. 15, 2013, Notice of Allowance.
U.S. Appl. No. 13/414,512, Aug. 1, 2013, Office Action.
U.S. Appl. No. 11/528,790, Jan. 10, 2014, Final Office Action.
U.S. Appl. No. 11/864,764, Nov. 20, 2013, Office Action.
U.S. Appl. No. 13/414,512, Mar. 14, 2014, Final Office Action.
U.S. Appl. No. 13/719,084, Jul. 26, 2013, Office Action.
U.S. Appl. No. 13/719,084, Jan. 6, 2014, Notice of Allowance.
U.S. Appl. No. 13/972,089, filed Aug. 21, 2013, Nair et al.
Gasser et al., "An Architecture for Practical Delegation in a Distributed System", 1990 IEEE Computer Society Symposium, May 7-9, 1990, pp. 20-30.
U.S. Appl. No. 11/528,783, Feb. 4, 2015, Office Action.
U.S. Appl. No. 11/528,790, May 8, 2014, Notice of Allowance.
U.S. Appl. No. 11/528,898, Sep. 24, 2014, Office Action.
U.S. Appl. No. 11/772,179, Jul. 3, 2014, Final Office Action.
U.S. Appl. No. 11/864,596, Jun. 16, 2014, Notice of Allowance.
U.S. Appl. No. 11/864,760, Jan. 28, 2015, Decision on Appeal.
U.S. Appl. No. 11/864,764, Jun. 25, 2014, Final Office Action.
U.S. Appl. No. 11/864,764, Jan. 16, 2015, Office Action.
U.S. Appl. No. 13/414,512, Sep. 30, 2014, Notice of Allowance.
U.S. Appl. No. 13/972,089, Apr. 16, 2014, Notice of Allowance.

* cited by examiner

DELEGATION OF DATA MANAGEMENT POLICY IN AN INFORMATION MANAGEMENT SYSTEM

CROSS-REFERENCE TO RELATED APPLICATIONS

Not applicable.

BACKGROUND OF THE INVENTION

1. The Field of the Invention

The present invention relates to information management. More particularly, embodiments of the invention relate to systems and methods for classifying structured and/or unstructured data for use in assigning service areas and service level objectives to objects in a computer system.

2. The Relevant Technology

The world is slowly and continually moving from being paper-based to being electronic-based. This evolution is apparent in almost every aspect of life, from the workplace, to government institutions, to home life. In each area, old paper-based methods of communication and storage are being replaced by electronic information. Businesses have replaced bulky paper files and expensive storage rooms with electronic files and searchable databases. Tax-payers are encouraged to submit returns electronically rather than in paper form, and email is rapidly becoming a principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand.

As entities become more dependent on electronic data, the ability to manage electronic data becomes crucial for a variety of different reasons. For example, much of the electronic data maintained by an entity or organization often relates to different aspects of the entity and is often subject to various considerations. Without an effective way to manage the electronic data, it is difficult to apply the appropriate considerations to the data.

Further, often there is a large amount of unstructured data, meaning that the value of the data to the entity is not readily known, nor are the services required to manage the data. For example, an entity may have a file storage system that is regularly backed up, despite the presence of files on the system that have little or no value to the entity. Thus, without an effective way to sort, classify, and maintain the files, the entity pays for unneeded services.

Additionally, there may be data that is subject to certain state and federal regulations based on information stored in the content of the data. Without a method of searching data based on content, certain data or files may not receive the services mandated by the regulations, and the entity may be subject to liability.

Generally, there are a number of factors used to determine how data is handled and which services are needed to properly maintain the data. Some of the factors or considerations commonly used include data security, data backup, data retention, data access control, regulatory compliance, corporate compliance, and the like or any combination thereof.

Because most data systems are unstructured and inadequately classified, it is difficult to ensure that the appropriate services are being applied. In fact, even when one attempts to classify data, decisions on how to manage the data are complicated by limitations based on the organization of the entity, irrespective of the data. For example, any given entity typically has more than one "line of business." An engineering firm, for example, mainly involved with contract work for the government, often has data that is associated with the actual engineering work being performed. At the same time, the firm may also have data associated with the legal department, human resources, or other administrative aspect of the firm. While some data may belong exclusively to one line of business, other data may be shared between more than one line of business. Some of the data associated with the engineering work, for example, may have legal implications, making it necessary for both lines of business to have access for the data. In other words, a given entity often has various domains of data or different shares of data, which may belong individually to a line of business or may be shared among the various lines of business.

For each line of business, data is often subject to certain requirements that differ from the requirements that apply to data associated with other lines of business. Further, each line of business may have a different way of referring to types of data. Thus, each line of business will likely desire that the data receive a different type of service from an information service, making it difficult to establish a uniform system of classification that will satisfy the demands of each of the lines of business.

Many information management systems known in the current art use a one-dimensional system to determine what levels of service objects receive. Rather than taking into account the realities of current business entities, these systems typically classify objects according to only one service category. This methodology restricts such entities from effectively managing and safeguarding their data. As a result, entities may have too much or too little protection for their data. Thus, there is a need for an information management system that is capable of effectively and efficiently classifying and orchestrating service levels for all the data objects in an entity's system.

Various information management systems and methods exist, some of which address these and other factors. One difficulty in designing an information management system, however, is that the amount of electronic data that can be managed by the information management system is limited by the physical and processing constraints of the hardware implementing the information management system. For instance, an information management server is necessarily limited in the amount of electronic data it can manage by, among other things, the speed and size of its processors and other hardware. Thus, the scalability of an information management system is an important consideration for entities desiring to implement information management in a network.

Two conventional scaling solutions often implemented include scaling up and scaling out. Scaling up, for example, includes implementing the information management system in a server with faster hardware. Often, however, the cost of scaling up can be prohibitively high. Scaling out includes implementing the information management system in redundant servers, with each server managing a subset of a network, or partitioning/separating out low-level information management functions to other servers. In the former case, the use of multiple information management servers can present integration difficulties and in the case of the latter, high-level functions not partitioned to the other servers still require significant computing resources from the information management server.

What are needed, therefore, are improved methods and systems for managing electronic data in a network.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
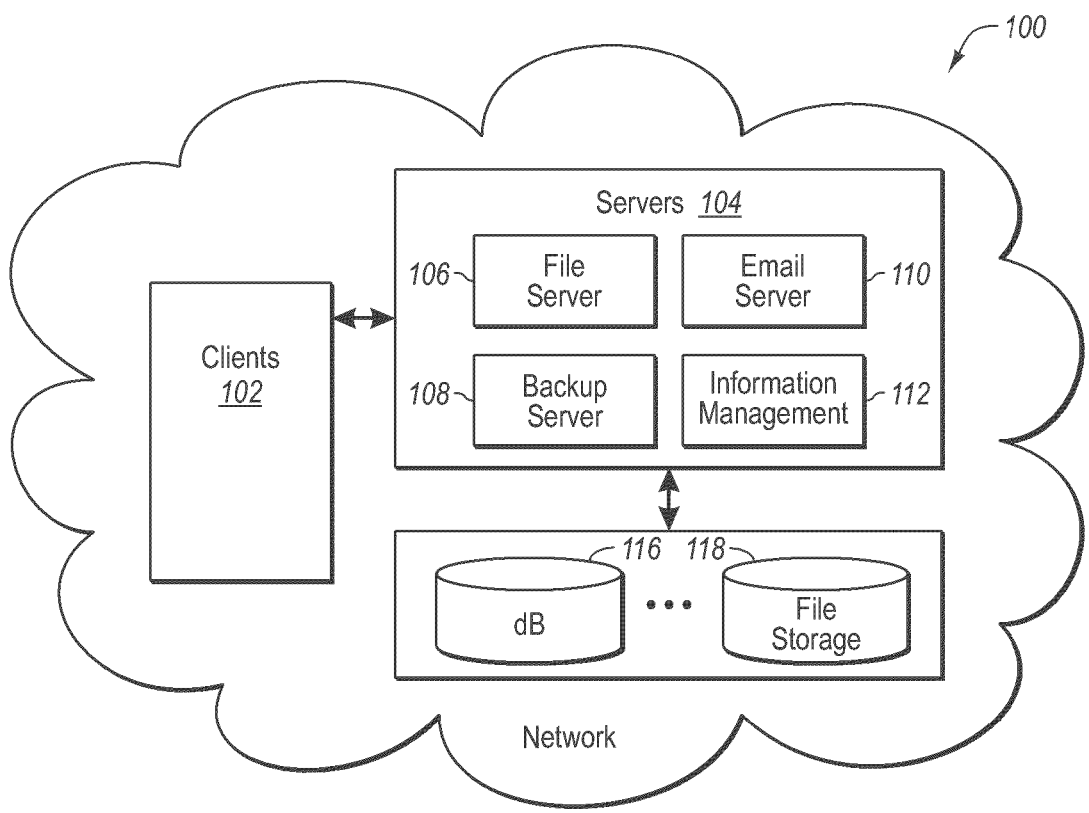
FIG. 1 illustrates an example environment for implementing embodiments of the invention.

Embodiments of the invention relate to the ability to delegate the policy for orchestrating data management in a system such as a computer system. Data management enables an information management system to identify and orchestrate services such as data protection, data placement, corporate compliance, and others based on the value of the underlying data. Embodiments of the invention enable system to implement various services to data in a highly automated fashion that provides various levels of granularity that can be adjusted as needed. An entity can be assured that its data is receiving the services that are actually required. Further, embodiments of the invention enable the orchestration of data management to be performed by an external computing resource, thereby increasing the efficiency of the information management system.

Implementing data management in accordance with the present invention requires an understanding of computer systems, networks, or servers operating on the systems, services operating on the system, and of the objects (e.g., directories, volumes, files, folders, user data, system data, content, servers, databases, applications, services, operating systems, instructions, information, emails, computer settings, etc.) that exist in or are accessible by clients, servers, applications, and services on the system. By way of example only, a computer system can be a single computer, a collection of computers (including clients, servers, and applications) that are connected with a network, and the like or any combination thereof.

In one embodiment of the invention, the information management system may orchestrate data management for data objects by associating categories with the data objects during an information classification process. Information classification may include discovery of the computer system in order to provide the information management system with an understanding of the relationships that may exist between the various servers (and other devices) on the computer system and the data that is accessible over the system. According to the present invention, the discovery of a network provides information that can be used to classify the network and the data in the system.

After the computer system (environment and data) has been discovered, it may be useful to classify the system environment and the data that is in the system. In one embodiment, the system may enable each object to be categorized and classified individually according to a series of entity-defined rules, although default rules can also be applied. An object can be any data (e.g., file, content, email, web page), server, service, application or the like in the system or in the environment in which information management is practiced. Classification is discussed more fully below and typically uses series of rules and/or logic that are applied to or based on the environment, content, or metadata to differentiate the data. Further, the information classification process may include the generation of metadata. Then, using the existing metadata and metadata generated during the classification process, categories can be assigned to each object.

Once classification is complete, the information management system may use the categories created during information classification to perform service level management. Service level management provides methods for modeling/mapping the results of discovery and/or classification to service levels. Service level objectives, for example, can be determined based on the assigned categories. After service level objectives have been identified, the various service levels can be selected. Next, using aspects of the invention, the selected services may be orchestrated and executed using a computer resource that is external to the information management system. By delegating portions of the information management process to external resources, the information management system is able to effectively operate using less space and processing power. Thus, the orchestration of data management is one part of a broader information management service and it provides a mechanism whereby the management services may be carried out with respect to individual objects rather than on shares or drives. As a result, an entity may only pay for the services that are actually needed rather than pay for services that may not be needed. Further, data, including unstructured data, is categorized and can be provided with the services based on its value to the entity in a scalable and cost effective manner.

Information management is also a process that can be ongoing. Information management can also be implemented in various types of environments. Embodiments of the invention, for example, can be implemented on computer systems such as a single computer or in a network or series of computers. In each of these examples of a computer system, the environment and data are discovered and classified. Service levels are then identified based on the categorizations assigned during information classification. The resulting services associated with the service levels may then be orchestrated. Alternatively, the categorization may be used to evaluate existing data without requiring the selection and orchestration of services.

In most computer systems, objects are continually added to the system and those objects typically require certain services. In addition to new objects, many objects also have a lifecycle associated with them. Other objects may change over time (by being edited, for example). As a result, the status or need for services for certain objects can change over time. Information management incorporates lifecycle aspects such that data that grows old or stale can have the various services changed as needed.

Also, embodiments of the invention include reports, auditing, and the like to ensure that the services being provided are adequate. This protective ability ensures, for example, that a company complies with any applicable rule or regulation. The detection of a gap in service, for example, can lead to a change in service levels.

I. Computer System Environment

FIG. 1 illustrates an example environment for implementing embodiments of the invention. FIG. 1 is intended to illustrate that, while many systems often have similar functions, the actual implementation from one computer system to the next can vary significantly. The variability in computer system configurations is one of the aspects that have hindered conventional attempts at information management. The variability may be related, for example, to the type of software installed, the hardware selected for the computer system, the configuration of the hardware/software and the like. As previously described, this is one of the reasons that discovery of a computer system is not limited to the objects in the system but also includes discovery of the servers and services that are operating in the system. An understanding of the servers and services can improve the ease and accuracy with which objects are classified.

In this example, the system 100 represents a network such as a local area network, a wide area network, and the like or any combination thereof. The connections in the system or network 100 can be wired and/or wireless. In this case, the network 100 typically includes clients 102 that have access to various servers 104 and to data 114. Various applications and services are typically provided by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, and an information management server 112 and the like or any combination thereof. Each of the servers 104 resides in or is accessible over the network 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the applications that operate on the servers 104, clients 102, and on the data 114 in some instances, may have certain properties or configurations. As previously discussed, it is this variability that can often complicate the ability to manage the information in a computer system.

II. Information Management in a Computer System

Information management according to embodiments of the invention has several components that work together to provide an understanding of the value of an entity's information. In some instances, the entity itself can provide or define some of the logic or rules that are used to classify or categorize the objects. Embodiments of the invention enable an entity to control some or all of the logic used for classification. Advantageously, this illustrates one way that embodiments of the invention enable an entity to better value its data. Objects can be classified or categorized individually using the entity's own logic. As a result, the service levels ultimately identified for those objects reflect the entity's perception of the objects' worth.

For example, an entity may want to retain objects that were authored by a particular person for a long period of time. A rule to that effect that is processed for the objects of the entity can then help classify the objects in an automated manner and the entity may evaluate the cost of assuring that all objects that satisfy that requirement receive the appropriate services. Advantageously, the present invention enables the entity to use the classification system to evaluate the cost of implementing the desired service levels.

While this example illustrates the evaluation of a single rule or objective, an information management system can examine all business objectives for the objects in a computer system, not just one at a time, and use the information classification process to associate those objectives to the files without disrupting any additional associations. For example, some of the files authored by a particular person may also contain personal data on employees who have left the entity. Such files often fall under laws that require their destruction after a certain time period. Thus, some of the files authored by the person may need to be retained for a shorter length of time due to a more pressing consideration (regulations). One embodiment of information classification can thus consider both the desire to retain files written by the author and consider regulations at the same time, for each object. This aspect of the present invention enables a sophisticated information management system to recognize conflicting service goals without disassociating the data from any of the service areas, as in this example, and then resolve the conflict. User defined configurations, for example, may be used to resolve conflict. For example, regulations may have priority over an entity's desire to retain certain files. In another example, the objectives may not conflict, but be additive. For example, an entity may desire to retain all files written by a particular author and make those files searchable by indexing them.

Information management also reduces various risks (such as non-compliance) often associated with data including unstructured data. As described below, embodiments of the invention provide a system for classifying data such that the appropriate services can be provided to the data. Embodiments of the invention also enable services that are required by an entity to be effectively identified and orchestrated. Examples of the services often required by entities for their data include backup services, retention services, corporate compliance services, regulatory compliance, data accessibility, data deletion, access control, disaster recovery, and the like or any combination thereof.

As discussed above, the orchestration of services to the data objects is typically a portion of the larger information management process. In order to more fully explain the service orchestration, an explanation of the methodology of information management is presented in the context of FIG. 2. Following this introduction, a more detailed explanation of the delegation of information classification according to the present invention will be given below.

A. Discovery in Information Management

Figure 2:
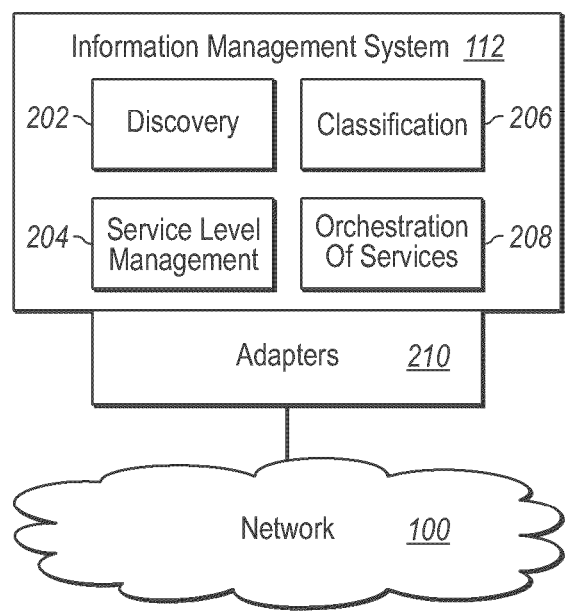
FIG. 2 illustrates one embodiment of a system and/or method for providing information management.

FIG. 2 is a flow diagram illustrating an example system and method for information management of data including unstructured data files or objects. FIG. 2 provides a preliminary overview of information management, with the delegation of data management orchestration discussed in greater detail below with respect to FIGS. 3-6.

Discovery 202 is often the first aspect of information management. Generally, in one method of information management, discovery 202 includes both a discovery of the infrastructure or of environment objects (servers, devices, applications, etc.) and of the other objects (data, files, etc.) in the computer system. Thus, discovery 202 may be used to discover all the data objects to be classified by the present invention.

The discovery of the environment, for example, can include a discovery of all IP devices on the computer system 100 that appear to act as a server. In discovering these servers, discovery 202 includes discovering services and applications as well. Thus, discovery 202 includes discovering the servers, services, applications and data residing in a system.

The discovery of a computer system can be done in a variety of ways. The discovery of the environment objects, for example, may involve an examination or analysis of all IP addresses existing in a network. Devices that act as a server can thus be identified. Once these servers are identified, additional information can then be sought from those servers.

Applications can also be discovered. For example, many entities often have a payroll application that includes software working in conjunction with a database. The database can be examined and may have certain table or logs when acting, for example, as source for payroll application. The traffic on a network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other objects.

The discovery of all objects in a computer system is accomplished, in one embodiment, through the use of adapters 210. Each adapter enables the information management system to identify objects in or operating in the computer system 100. Alternately or additionally, the adapters enable the information management system to discover information about the objects. For example, some adapters can identify objects acting as a server or data objects such as files. Other adapters are specific to a particular type of server and may be able to collect firmware version, operating system, and other configuration data that is specific to that type of server. Other adapters can collect generated metadata or can examine the content to collect the existing metadata.

B. Classification in Information Management

Classification 206 is typically the next step in information management. However, the discovery of an environment does not need to be repeatedly performed. Once an environment is discovered, information management can then focus on the data that is in the computer system. Classification 206 is the process of collecting information about the objects (data and/or the environment) of a computer system and then identifying or associating the objects with categories. One result of classification is to associate objects being classified with certain categories. More particularly, information collected for objects identified during discovery 202 can be used to assign categories to the objects. The resulting categories can be used in subsequent parts of information management as described below.

Classification 206 can incorporate information collected during discovery, such as existing object metadata. Existing metadata can also be collected during classification 206. Alternately or additionally, classification 206 can include applying sets of rules or other logic to the objects in a computer system and using these rules to generate metadata. The rules can be default rules or rules that are selected according to a line of business of the entity or for any other reason. For example, objects that include social security numbers may have to be retained for some period of time per governmental regulations. Alternatively, objects whose owner is a member of marketing may only be retained for a few years but require full indexing.

In addition to applying rules to the objects of the entity, classification 206 also includes the generation of metadata, and applying the categorization rules to existing and newly generated metadata to assign a category. Generated metadata includes values that are derived from information objects rather than having been collected by the environment. For example, hash values can be generated and then used to identify duplicate objects. Another example of generated metadata is the case where the objects are examined for specified content such as keywords and/or patterns. This generated metadata, or metadata derived from an object being analyzed, are useful during the classification process. Existing metadata, on the other hand, can be collected from the objects or from the environment. For example, the owner, size, share, etc., of a file can be collected and used to automatically categorize an object. The collected metadata (both generated metadata and/or existing metadata) can then be used to assign categories relating to the content of the object or the object itself. In some embodiments, a particular object may be associated with more than one category.

In another embodiment, aging considerations or object lifecycle can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

One aspect of the present embodiment is the system's ability to recognize independent groupings (domains) of information owners, each of which can configure separate logic for classification and service mapping, even when service options (list of available service levels) are common to all groupings. Thus, whereas conventional information classification systems provide for an object to belong to only one area of service protection, the present invention is more closely tailored to current business models where various groups, or lines of business, may each have different considerations in determining the importance and relevance of information and the service levels each object requires. For instance, an engineering department may have only a cursory interest in the ability to retrieve files associated with each revision of an antiquated product-line, while the legal department may desire the same files to be easily accessible for litigation purposes. Under the embodiment of the present invention, each business line or domain may be associated with a different service level to be considered in determining the importance and relevance of each object within the management scheme.

Methods and systems for classifying objects in a computer system are disclosed in greater detail in U.S. patent application Ser. No. 11/528,772, filed Sep. 27, 2006 and entitled "Information Classification," which application is incorporated herein by reference in its entirety.

C. Service Level Mapping in Information Management

After the objects have been categorized during classification 206, service levels or service level objectives can then be identified for the various objects during service level management 204. Examples of service level objectives include backup, retention, tiered storage, encryption, access control, disaster recovery, and the like or any combination thereof for the objects or for the environment of the computer system. A category can be mapped through configuration data in one example to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflict, for example, using user supplied logic.

In other words, the classification process has already assigned categories to each of the objects. During the classification process, some of the various categories are assigned to each object as applicable. These categories can then be used to identify the service level objectives that may apply to the various objects. The classification, for example, may have identified a particular object as an annual report. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time, which may be different.

In this manner, the object that has been classified is then processed to identify the various service level objectives that should apply to the object. The service level objectives can then be bundled together into a target bundle that represents the service level objectives that are desired for the object. Next, service level mapping includes matching the target bundle of services with service packages that are actually available from service providers. If the service level objectives of the current bundle do not match or are not satisfied by the best matching actual service package, then a service gap is present. While embodiments of the invention may be used to select a particular service package, the invention could actually be used to provide services on a per object basis. Service providers, for reasons of practicality, often group services as a package and thus a service package is often selected, but embodiments of the invention extend beyond this particular aspect.

The use of service packages is often used by some entities that manage some or all of their services by restricting the offerings to a number of supported combinations of service levels. In other words, the particular combination of service level objectives may not correspond to a supported service package (also referred to herein as a service bundle). Embodiments of the invention contemplate logic that is used to find a suitable service package that is close enough to what the object needs. The information management system may be able to report that no existing service bundle or service package was sufficient.

D. Service Orchestration in Information Management

In information management, orchestration of services 208 is the process by which the services are orchestrated. Orchestration can automate multiple service actions and translate an end user service level request to provider action. The workflow needed to execute the services is coordinated during orchestration. Often, action orchestration requires the adapters to communicate with various service providers or with the various services to identify the service that can perform the requested action.

III. Delegation of Information Management Functions

Various portions of the information management process may require a significant amount of processing power from an information management system, including the information classification and service orchestration processes. Consequently, the network or computer system size that can be efficiently managed by the information management system is necessarily limited by the processing capabilities of the information management system. However, embodiments of the invention contemplate the delegation of the intelligence required to perform at least one data management process to a computing resource external to the information management system, such as an file or data manager. By delegating some processes, including those that may be computationally expensive, the information management system is able to offload work from the system, while retaining the ability to perform other data management processes, enabling the information management system to manage relatively larger networks or computer systems.

Figure 3:
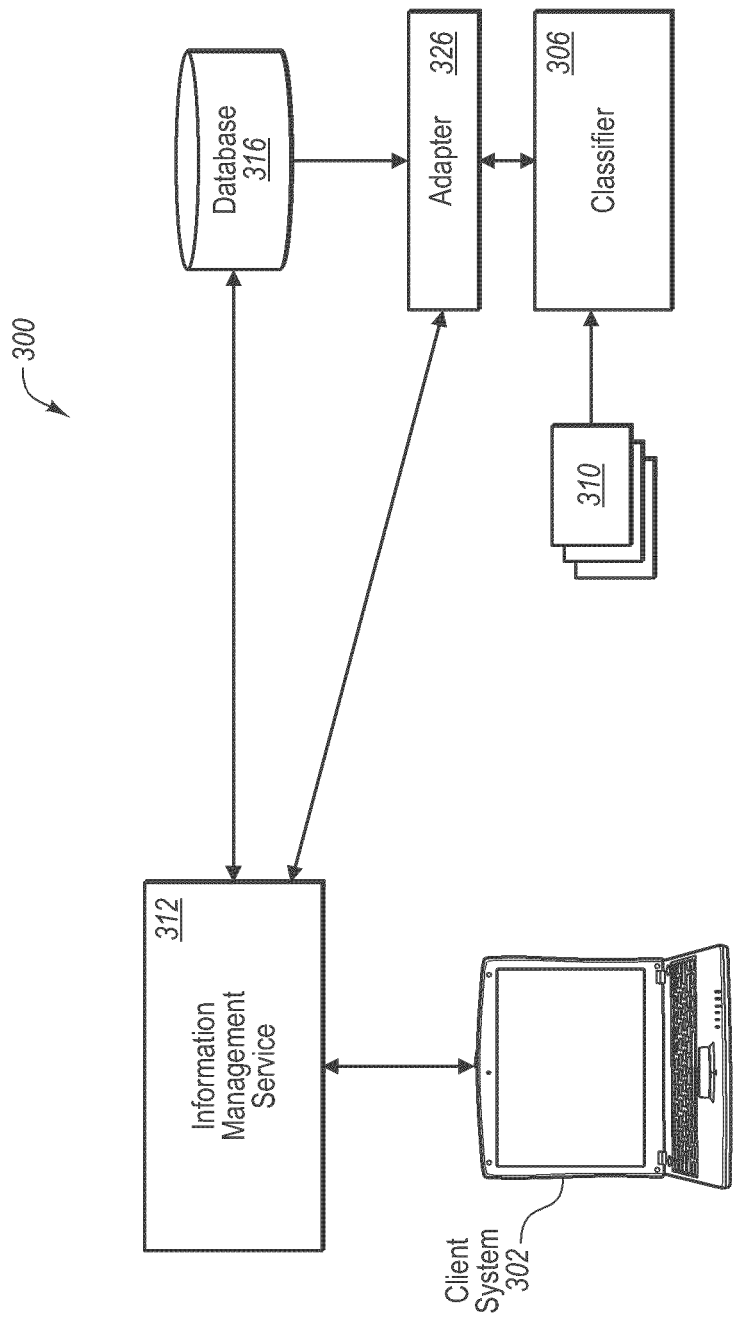
FIG. 3 illustrates one embodiment of a system for delegating information classification to a classifier.

Accordingly, FIG. 3 illustrates an example system 300 for delegating a data management policy to an external computing resource. The system 300 includes an information management system 312 for managing data, a client system 302 for configuring the information management system 312, a database 316 for storing configuration data, and a data manager for performing the data management aspects of information management. In the present example, the information management system 312 and the client system 302 may correspond to the information management system 112 and clients 102, respectively, of FIG. 1. The data manager may be a server to which the policy for managing the system's data may be delegated.

The information management system 312 delegates the intelligence and policy required to perform service orchestration to the data manager 306. In this manner, the data manager 306 can initiate various service tasks based on high-level data received from the information management system 312, such that the data manager 306 can use its own internal logic and capabilities to monitor data objects without requiring prompts from the information management system 312. For instance, in the present example the information management system 312 provides the logic and rules necessary for data management to the data manager 306. Not only can the data manager 306 perform low-level functions, such as moving objects from one type of database or storage unit to another, the data manager 306 can also perform high-level functions such as moving or monitoring data objects based on the various categorizations assigned to the objects during the classification process (e.g., file X belongs to category Z and category Z files require daily backup, so file X needs to be backed up daily). By sending a communication including high level data to the data manager 306 rather than a constant stream of low level data significantly reduces the processing power required by the information management system 312.

The information management system 312 is provided in a computer system and configured through a user interface such as a client computer 302. A system administrator or other user can use the client computer 302 to specify configuration data for the information management system 312, including logic and rules to apply during the orchestration process, such as information management categories for objects and the types of services required by the categories of objects. For example, configuration data may specify that objects belonging to a certain category (e.g., HIPAA files), require a certain type of service (e.g. data retention).

While the configuration data can be user-specified, default configuration data can also be used. In another embodiment of the invention, the information management system 312 can include a plurality of user-selectable configurations. Each of the user-selectable configurations can be directed to a particular industry, such as healthcare, legal, energy, high tech, etc. Typically, the configuration data—whether user-specified or default—is stored in the database 316.

In some instances, the user may elect to change or modify the existing configuration data and data management policy. In such instances, aspects of the present invention allow the information management system to propagate the new policy to the file manager or other intelligent service device in order to replace the old rules and policy with the new configuration data and data management policy.

In the present embodiment, the configuration data and policy necessary for performing various actions on the data (e.g., the logic and rules) is provided to the data manager 306. In some embodiments, the information management system 312 may express the logic and rules for service orchestration in a first format, while the logic and rules would have to be expressed in a second format for the data manager 306 to understand them. For this reason, the information management system 312 may communicate with the data manager 306 using an adapter 326. In effect, the adapter 326 translates communications between the data manager 306 and the information management system 312. Stated another way, the adapter provides a common language for the information management system 312 and the data manager 306. Thus, the data manager 306 and system 312 can communicate directly if they implement the same language (i.e., if they express logic and rules the same way), or the data manager 306 and system 312 can communicate through the adapter 326 if they implement different languages. Optionally, the database 316 can include a library of adapters such that the information management system can delegate the service orchestration process to any one of many different file managers. Alternatively or additionally, the adapters may be downloadable from a network.

In operation, the information management service 312 obtains a list of objects 310 which have been associated with various categories which are in need of various types of services from the file manager 306. The objects 310 may be associated with the various categories during classification 206, and those categories assigned various levels of services during service level management 204, as illustrated in FIG. 2. The data manager 306 uses the configuration data and classification information to execute the services to the objects 310 in each category, For instance, the data manager 306 may apply the logic and rules specified in the configuration data to identify and perform various services to the objects 310. In one embodiment, the data manager 306 may then report the status of the data management back to the information management system. Generally speaking, the delegated policies may include information which identifies categories of objects 310 and one or more service that need to be performed to the objects in the categories.

Upon receiving the data management policy, the information management system 312 can use the policies to perform various types of operations. That is, the information management system may identify one or more service level objectives for each object based on the assigned categories, map the one or more service level objectives to service levels available from service providers, and initiate or propose a variety of services for the objects. In one embodiment of the invention, the information management system 312 may also monitor the data manager 306 to ensure that data management is being properly performed.

Figure 4A:
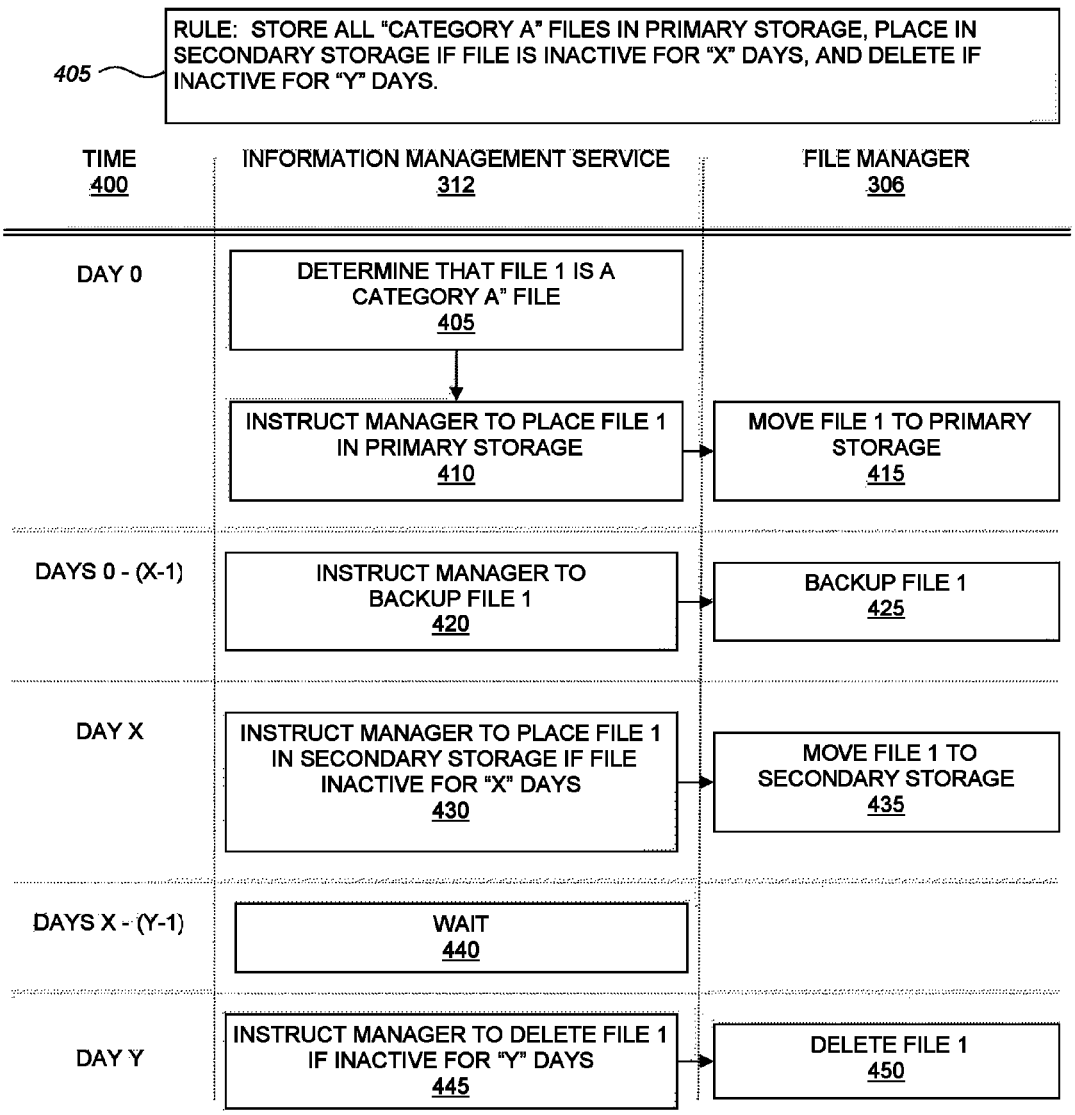
FIGS. 4A-4D and 5 illustrate the ability for the information management system of the present invention to delegate varying degrees of policy to an external computing resource, such as a data manager.
Figure 4B:
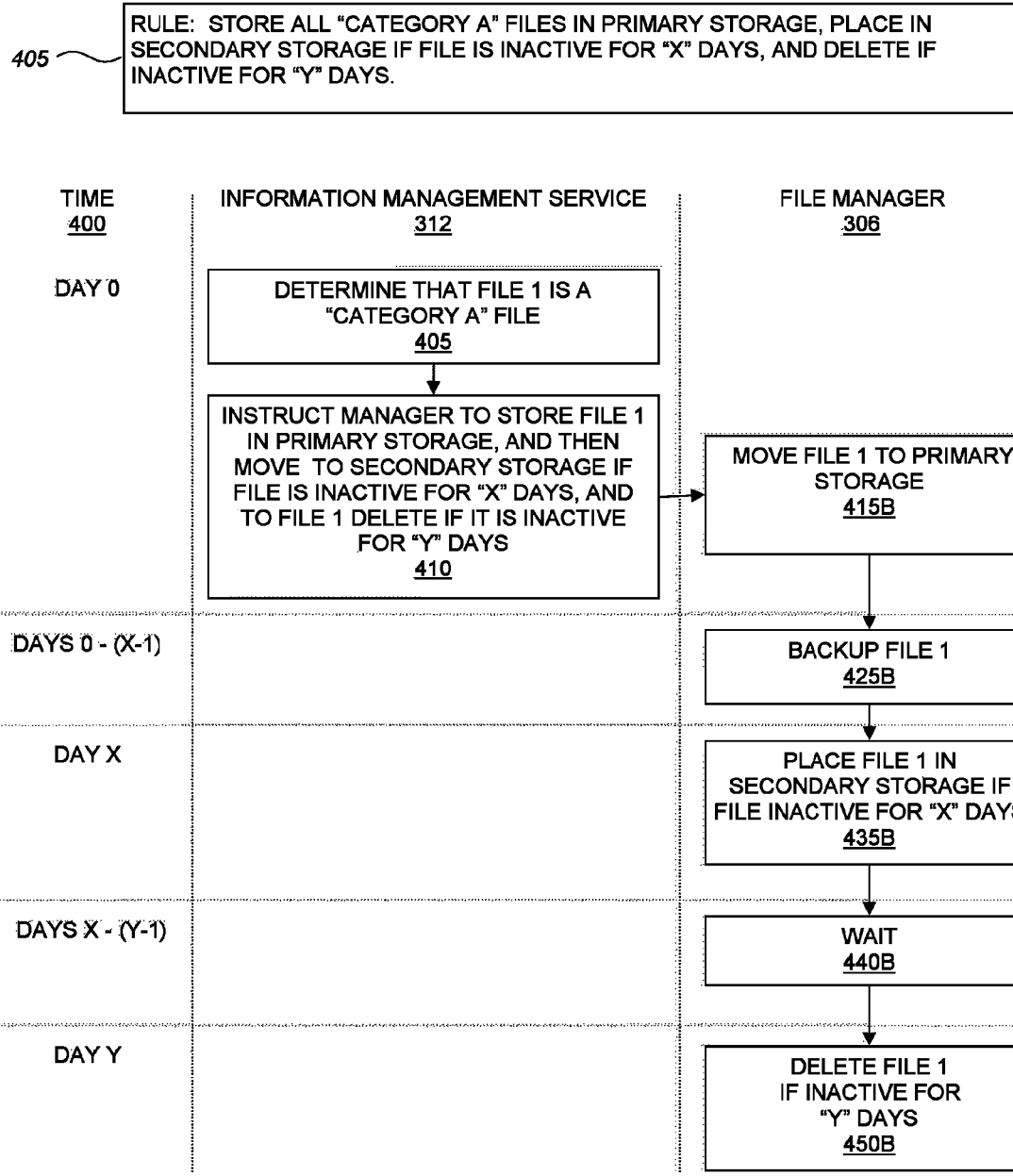
Figure 4C:
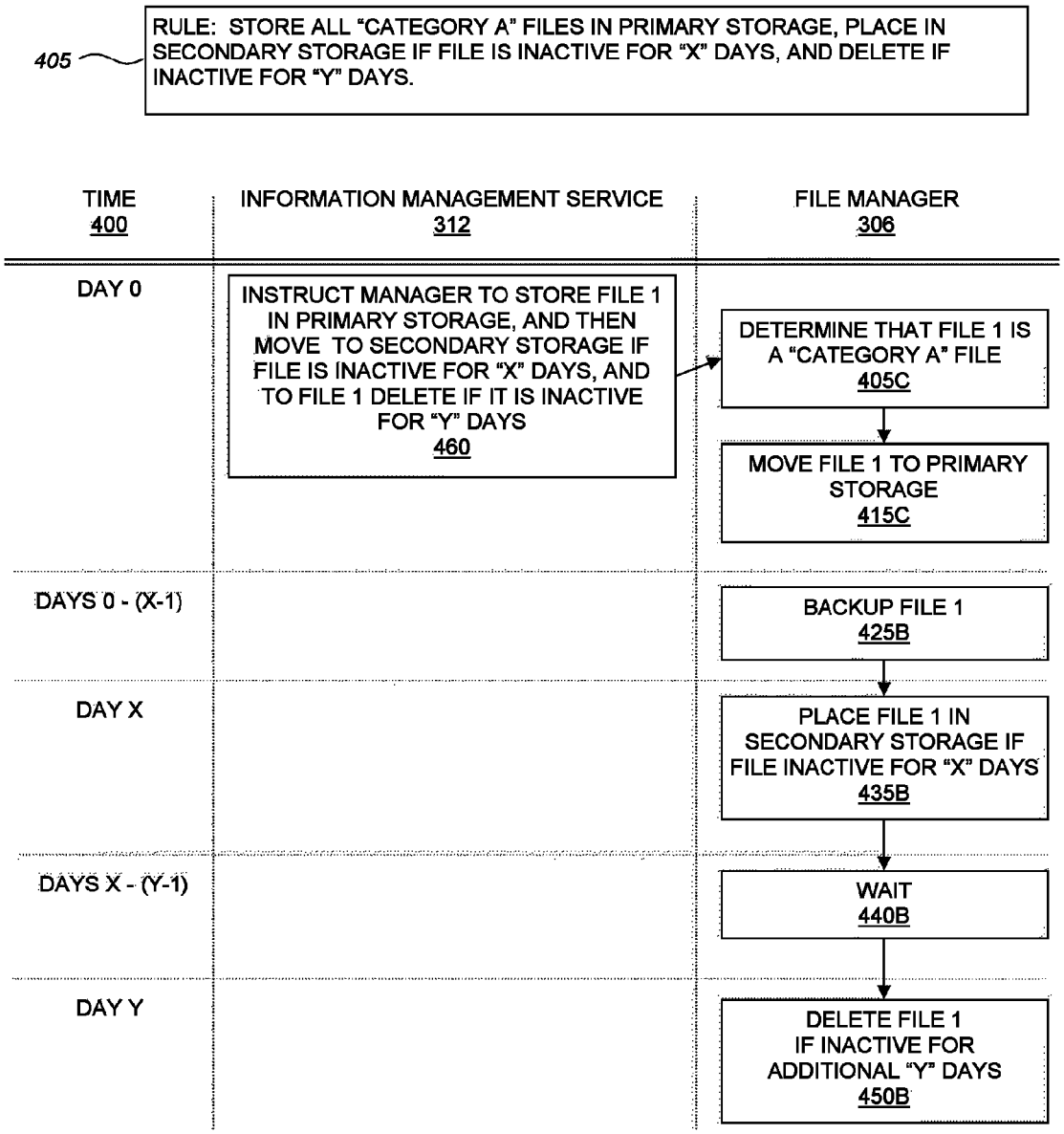
Figure 4D:
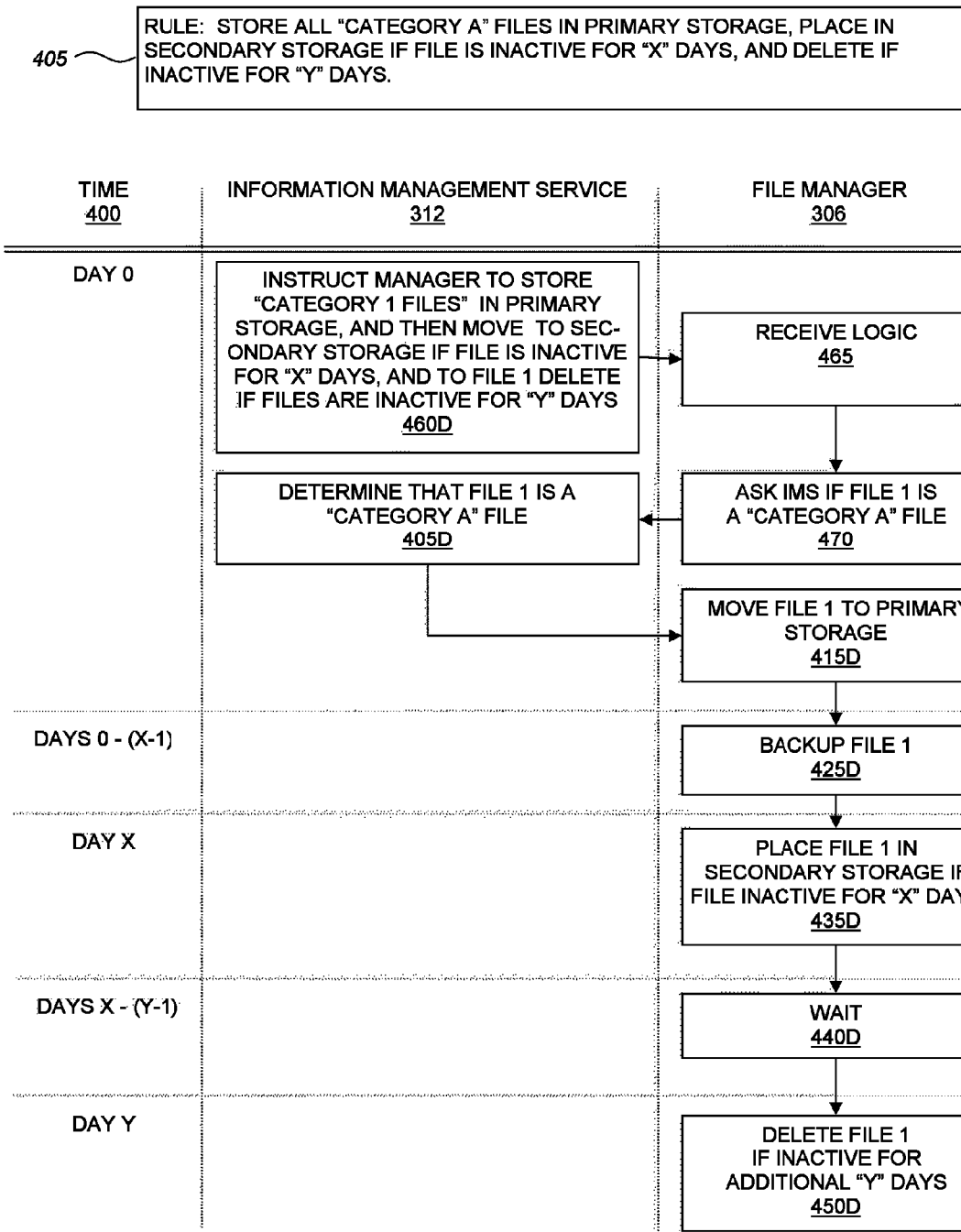
Figure 5:
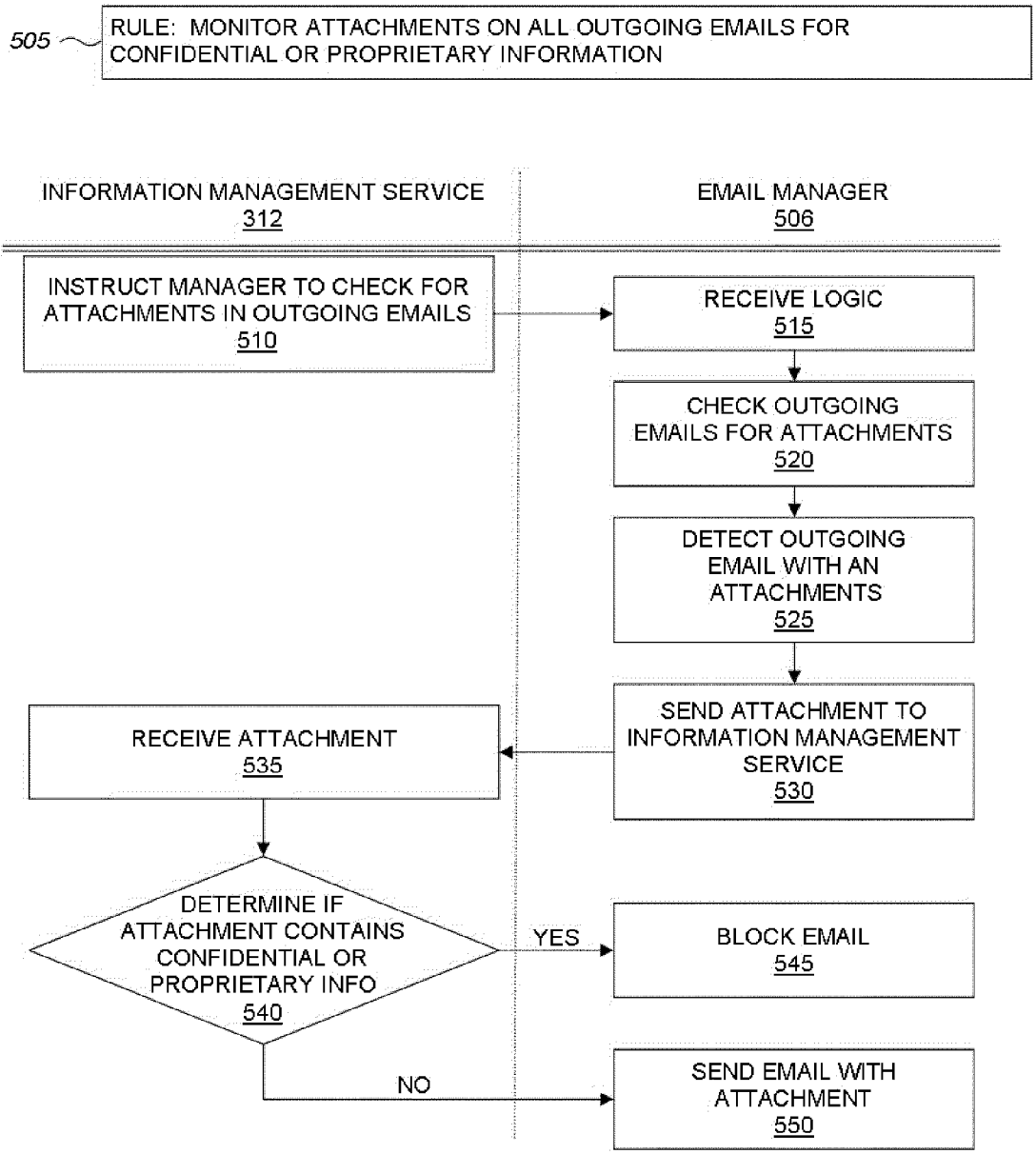

The logic or responsibilities delegated to the data manager 306 can be implemented in varying levels, as illustrated in FIGS. 4A-4D and FIG. 5. In order to illustrate the various ways that logic and policy may be delegated to the data manager 306, FIGS. 4A-4C will now be described. FIG. 4A illustrates an example of service orchestration in an information management system according to the current state of the art, wherein all the logic and rules reside in the information management system, which sends a series of low-level commands to the data manager 306. FIG. 4B illustrates a second example of service orchestration which implements embodiments of the invention, wherein the treatment or execution of orchestration policy is delegated to the data manager 306. FIG. 4C illustrates another example of a system which utilizes aspects of the invention, wherein the orchestration policy is delegated to the data manager 306. FIG. 4D and FIG. 5 illustrates another example of embodiments of the invention in a system, referred to as an "injection of policy" system, wherein some of the orchestration policy is delegated to the data manager 306, but the data manager 306 still delegates some decision making to the information management system using a series of call-back functions.

As previously mentioned, FIG. 4A illustrates an information management system, or IMS, according to the current state of the art. In this example, the rule 405 or logic being implemented by the system has designated all "Category A" files as data objects which require primary storage, if however, the data is not accessed for "X" days, the data should be moved to secondary storage. If the data remains dormant for "Y" days, then the data should be deleted from the file system. In this configuration, the information management service 312 first determines 405 that "File 1" is a "Category A" using the classification information generated during the classification process described above. Based on this information, the IMS 312 sends 410 a communication to the file manager 306 instructing the manager to place "File 1" in primary storage. Based on this command, the file manager 306 moves 415 "File 1" into primary storage. Next, for the next "X−1" days, the IMS 312 sends a series of daily commands to the file manager 306 instructing 420 the file manager 306 to backup "File 1." Upon receiving these commands, the file manager 306 backs 425 up "File 1."

On "Day X" the IMS 312 determines that "File 1" has not been accessed for "X" days and prompts 430 the file manager 306 to move "File 1" to secondary storage. Upon receiving the communication from the IMS 312, the file manager 306 moves 435 "File 1" to secondary storage. During the period of time between "Day X" and "Day Y–1," the IMS 312 does not send 440 any prompts to the file manager 306 and "File 1" remains in secondary storage. On "Day Y" the IMS 312 determines that "File 1" has not been accessed for "Y" days and instructs 445 the file manager 306 to delete "File 1," and the file manager 306 deletes "File 1." Thus, in FIG. 4A, the orchestration of all the service operations are initiated by the IMS 312 and communicated to the file manager 306 as low-level commands.

Using the same rule 415 as the example shown in FIG. 4A, FIG. 4B illustrates a system wherein the treatment of the data has been delegated to the file manager 306. Similar to the example shown in FIG. 4A, the IMS 312 initially determines 405 that "File 1" is a "Category A" file. Next, the IMS 312 instructs the file manager 306 to place 455 "File 1" in primary storage with daily backup. The IMS 312 also instructs the file manager 306 to move "File 1" into secondary storage if the file is not accessed for "X" days, and to eventually delete the file if it remains unaccessed in secondary storage for "Y" days. Upon receiving the instructions from the IMS 312, the file manager 306 then initiates and performs the various services using its own internal logic. Thus, "File 1" is moved 415B to primary storage and backed up 425B until "Day X" wherein it is determined that the file has been unaccessed for "X" days. Then "File 1" is moved to secondary storage 435B and subsequently deleted 450B after remaining dormant for "Y" days. One advantage of this configuration is that it requires fewer communications and prompts from the IMS 312, freeing up valuable processing time in the IMS 312.

Another level of policy delegation is illustrated in FIG. 4C using the same policy illustrated in FIGS. 4A and 4B. In this configuration, the a higher level of policy is delegated to the file manager 306. Instead of managing each step of the policy, the IMS initiates the data management process by sending 460 the policy or rule 405 to the file manager 306, which then reviews the classification information associated "File 1" to determine 405C whether or not the file is a "Category A" file. Once "File 1" is determined to be a "Category A" file, the file manager 306 then initiates the execution of services to "File 1." Thus, "File 1" is moved 415C to primary storage and backed up 425C until "Day X" wherein it determined that the file has remained dormant for "X" days, and it is moved to secondary storage 435C. Later, it is determined that "File 1" has been dormant for "Y" days and the file is subsequently deleted 450C. Similar to the example illustrated in FIG. 4B, one advantage of this configuration is that it requires very little processing time in the IMS 312, and instead relies on the internal logic and commands of the file manager 306.

In some instances, it may be advantageous to delegate a large portion of the orchestration policy to the data manager 306, while still relying on the IMS 312 for key decisions. Advantageously, this allows the system to utilize the logic of the data manager 306, without requiring the data manager 306 to make all the high level policy decisions about the data objects in the system. For example, the data manager 306 send callback functions or similar queries to the IMS 312 for some high level policy decisions.

FIG. 4D is an example of a configuration using the same rule as illustrated in FIGS. 4A-C wherein the data manager 306 relies on a callback function to the IMS 312. In this example, the IMS 312 initiates the data management process by sending 460D the policy or rule 405 to the file manager 306, which then receives the logic 465. The file manager 306 then locates a number of data objects, including "File 1," and uses a callback function to the IMS 312 to ask 470 whether "File 1" is a "Category A" file. The IMS 312 then receives "File 1" in a callback function and views the classification information associated "File 1" to determine 405D whether or not the file is a "Category A" file. Once "File 1" is determined to be a "Category A" file, the IMS 312 sends a communication to the file manager 306 indicating that "File 1" is a "Category A" file. The file manager 306 then initiates the execution of services to "File 1." Thus, "File 1" is moved 415D to primary storage and backed up 425D until "Day X" wherein it determined that the file has remained dormant for "X" days, and it is moved to secondary storage 435D. Later, it is determined that "File 1" has been dormant for "Y" days and the file is subsequently deleted 450D.

Another example of a configuration using a callback function to the information management system is illustrated in FIG. 5. In this example, the policy or rule 505 dictates that all attachments on all outgoing emails should be monitored for confidential or proprietary information. To orchestrate this policy, the IMS 312 instructs an email manager 506 to check 510 all outgoing emails for attachments. The email manager 506 receives 515 the policy and initiates a policy wherein all outgoing emails are checked 520 for attachments. When the email manager 506 detects an outgoing email with an attachment 525, the attachment is sent 530 to the IMS 312 in a callback function. Next, the IMS 312 receives the attachment 535 and determines 540 whether the attachment contains confidential or proprietary information. Based on the determination, the IMS 312 then sends a communication to the email manager indicating whether the email should be blocked 545, or whether the email should be sent 550 with the accompanying attachment.

Thus, as shown in the examples illustrated in FIGS. 4A-D and FIG. 5, one aspect of the present invention is the ability to delegate various levels of data management policy and logic to the data managers of the system. Advantageously, this allows an entity to create a system that optimizes the processing power and resources of the devices associated with the system.

Figure 6:
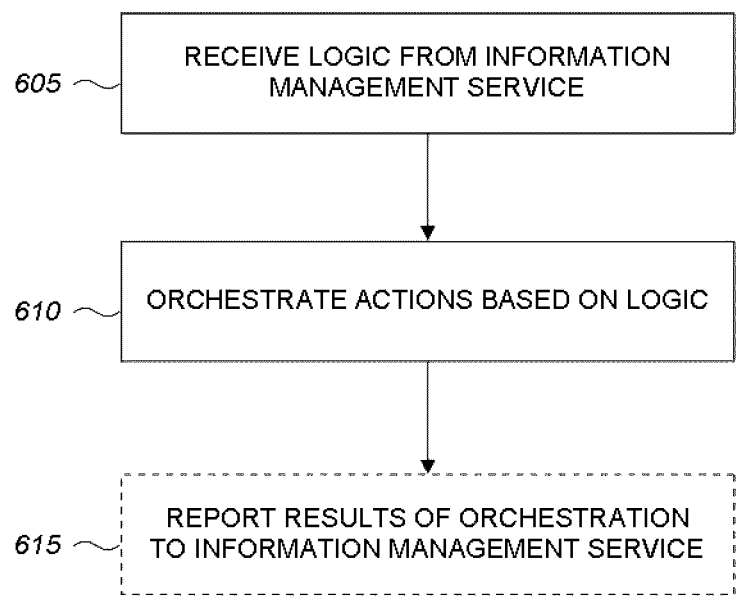
FIG. 6 is a block diagram illustration a method for delegating service orchestration to an external computing resource according to embodiments of the invention.

FIG. 6 illustrates method for delegating data management policy to an external computing resource such as a data manager. The method begins by receiving 605 logic in the form of rules and/or policy from an information management system 312 in a computer system. The logic may be stored in a database 316. The logic may be created by receiving user input (i.e., through a client computer 302), by the information management system 312 automatically generating specifying logic and rules to apply for classified data objects, or both.

The logic may be translated using an adaptor from a first format understandable by the information management system 312 to a second format understandable by the data manager 306. Then, the data manager 306 receives the logic and rules and uses them to execute 610 various services or actions on the data objects. In a preferred embodiment of the invention, the data manager 306 then sends monitoring information reporting the results of the services or actions to the IMS 312.

Information management enhances the ability of a system to manage its unstructured data across domains or enhances the ability of users to manage their data including unstructured data, across varying lines of business, and by identifying services that best meet the system's or entity's requirements. Furthermore, delegating data management policy to an external computing resource permits an information management system to efficiently manage more information than would be possible without the delegation.

By delegating the data management policy to an external computing resource, the total amount of data that can be managed by the information management system 312 increases while the amount of processing power required to manage a given amount of data decreases.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media, including, RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an information management system operating in a networked computing environment, wherein the information management system identifies and orchestrates services for data objects stored in the networked computing environment by delegating information management to intelligent service providers that operate on behalf of the information management system, a method for performing information management in the networked computing environment, the method comprising:

performing information management by an information management server on the stored data objects, wherein the data objects are each associated with at least one line of business, wherein the information management includes performing information management tasks that include:
collecting and generating, with the information management system, metadata about data objects stored in the networked computing environment in one or more locations remote from the information management system, wherein the data objects include any one or more of a directory, volume, folder, server, database, application, operating system, file, and email;
classifying each of the data objects individually to assign categories to each of the data objects individually by applying rules to the metadata, wherein data objects associated with a first line of business are classified by first rules and data objects associated with a second line of business are classified by second rules, wherein at least some of the first rules are different from the second rules;
performing service level management based on the assigned categories by mapping the categories of each data object to one or more service level objectives to determine service level objectives for each of the data objects and by mapping the service level objectives to services actually available to the information management system, and
orchestrating the services according to the service level objectives;
delegating, by the information management server, the performance of a first portion of a policy to the intelligent service provider, wherein the first portion of the policy takes the form of a first series of logic and rules that enables the intelligent service provider to perform a first portion of the information management tasks, the first series of logic and rules pertaining to the information management of the data objects stored in the networked computing environment and to one or more actions to be executed for the data objects based on assigned categories of the data objects, wherein the intelligent service provider performs the first portion of information management tasks on the data objects based on existing categories of the data objects assigned by the information management server or on categories of the data objects determined and assigned by the intelligent service provider while performing the first portion of information management tasks;
providing additional information, by the information management server, to the intelligent service provider in response to a callback issued by the intelligent service provider while performing the first series of logic and rules, wherein the intelligent service provider uses the additional information to perform the first portion of information management tasks, wherein the information management server performs additional logic and rules with respect to an object associated with the callback to determine the additional information;

receiving, at the information management server, reporting information from the intelligent service provider indicating that the first portion of information management tasks has been successfully executed for the data objects identified by the first series of logic and rules, the reporting information including results of the application of the first series of logic and rules to the data objects; and performing, by the information management server, a second portion of the policy, wherein the second portion of the policy takes the form of a second series of logic and rules that enables the information management server to perform a second portion of the information management tasks, the second series of logic and rules pertaining to the information management of the data objects stored in the networked computing environment and to one or more actions to be executed for the data objects based on assigned categories of the data objects, wherein the information management server accounts for the reporting information when performing the information management.

2. The method of claim 1, further comprising using an adaptor to translate the first or second series of logic and rules from a first format to second format understandable to the intelligent service provider.

3. The method of claim 2, further comprising using an adaptor to translate monitoring information from the intelligent service provider indicating whether the intelligent service provider has executed the actions for the objects from a first format to a second format understandable to the information management system.

4. The method of claim 1, wherein the first or second series of logic and rules are specified by a user.

5. The method of claim 1, wherein the one or more actions to be executed by the information management server or the intelligent service provider comprise at least one of (i) the services, the services including at least one of backup services, retention services, corporate compliance services, regulatory compliance, data accessibility, data deletion, access control, or disaster recovery, (ii) discovery of the computing environment, or (iii) classification of the data objects or of new data objects.

6. In an information management system operating in a networked computing environment, wherein the information management system performs information management that includes the identification and orchestration of services for data objects stored in the networked computing environment by delegating information management tasks to intelligent service providers that operate on behalf of the information management system, a method for discovering the data objects and performing a delegated data management process in an intelligent service provider connected via a network to the information management system, the method comprising:

receiving from the information management server, at the intelligent service provider, a first portion of a policy, wherein the first portion of the policy takes the form of a first series of logic and rules that enable the intelligent service provider to perform a first portion of the information management tasks, the first series of logic and rules pertaining to information management of the data objects stored in the networked computing environment and to one or more actions to be executed for the data objects based on categories of the data objects, wherein the information management system performs information management on the stored data objects, wherein the information management includes performing information management tasks that include:

collecting and generating, with the information management system, metadata about data objects stored in the networked computing environment in one or more locations remote from the information management system, wherein the data objects include any one or more of a directory, volume, folder, server, database, application, operating system, and email;

classifying each of the data objects individually to assign categories to the each of the data objects individually by applying rules to the metadata, wherein data objects associated with a first line of business are classified by first rules and data objects associated with a second line of business are classified by second rules, wherein at least some of the first rules are different from the second rules;

performing service level management based on the assigned categories by mapping the categories of each data object to one or more service level objectives to determine service level objectives for each of the data objects, and orchestrating services according to the service level objectives;

performing, by the intelligent service provider, the first portion of information management tasks by applying the first series of logic and rules to the data objects in the computing environment;

performing a callback function to the information management system for a first one of the data objects during the process of applying the first series of logic and rules to the data objects, wherein the information management system makes a decision regarding the first data object in response to the callback function by applying additional logic and rules to the first data object to make the decision, the decision related to the information management performed by the information management server;

executing, by the intelligent service provider, the one or more actions for the data objects based on the first series of logic and rules received from the information management system and based on the decision made by the information management system for the first one of the data objects returned to the intelligent service provider; and sending, by the intelligent service provider, reporting information to the information management system indicating that the one or more actions have been successfully executed, the reporting information including results of the application of the first series of logic and rules to the first one of the data objects.

7. The method of claim 6, further comprising using an adaptor to translate the first series of logic and rules received from the information management service from a first format to second format understandable to the intelligent service provider.

8. The method of claim 6, wherein executing the one or more actions for the data objects comprises retrieving classification information for the data objects in the computing environment and determining if the data objects are associated with categories of data objects which require one or more actions according to the first series of logic and rules.

9. The method of claim 7, further comprising using an adaptor to translate monitoring information from the intelligent service provider indicating whether the actions have been successfully executed from a second format to a first format understandable to the information management system.

10. The method of claim 6, wherein the first or second series of logic and rules are specified by a user.

11. The method of claim 6, wherein the one or more actions to be executed by the information management server or the intelligent service provider comprise at least one of (i) services, the services including at least one of backup services, retention services, corporate compliance services, regulatory compliance, data accessibility, data deletion, access control, moving data objects to a tier of storage based on the lifecycle of the data objects, or disaster recovery, (ii) discovery of the computing environment, (iii) classification of the data objects or (iv) orchestration of the services.

12. An information management system for performing information management in a computing environment, wherein the information management system identifies and orchestrates services for data objects stored in the networked computing environment by delegating information management to intelligent service providers that operate on behalf of the information management system, the information management system comprising:
   an information management server configured to perform a first portion of a policy, wherein the first portion of the policy takes the form of a first series of logic and rules that enables the information management server to perform a first portion of information management tasks with respect to data objects stored in the networked computing environment, the first series of logic and rules pertaining to one or more actions to be executed for the data objects based on assigned categories of the data objects, wherein the information management tasks include:
      collecting and generating, with the information management server, metadata about data objects stored in the networked computing environment in one or more locations remote from the information management server, wherein each of the data objects is associated with at least one line of business, wherein the data objects include any one or more of a directory, volume, folder, server, database, application, operating system, file and email;
      classifying each of the data objects individually to assign categories to each of the data objects individually by applying rules to the metadata, wherein data objects associated with a first line of business are classified by first rules and data objects associated with a second line of business are classified by second rules, wherein at least some of the first rules are different from the second rules;
      performing service level management based on the assigned categories by mapping the categories of each data object to one or more service level objectives to determine service level objectives for each of the data objects and by mapping the service level objectives to services, and
      orchestrating services according to the service level objectives and when a data object is associated with conflicting service level objectives, resolving the conflicts without disassociating the data objects from the services;
   a data storage device that is accessible by an information management server included in the information management system, the data storage device storing categorization information, wherein the categorization information includes categories assigned to each of the data objects during classification of the data objects;
   an intelligent service provider including a computing device configured to perform a second portion of the policy, wherein the second portion of the policy takes the form of a second series of logic and rules corresponding to a second portion of the information management tasks which pertain to the information management of the data objects stored in the computing environment and to one or more actions to be executed for the data objects based on the categorization information of the data objects, the second series of logic and rules delegated to the intelligent service provider for execution on behalf of the information management server, the intelligent service provider initiating the second portion of information management tasks that the information management server is capable of performing by applying the second series of logic and rules to one or more of the plurality of data objects in order to determine which data objects require the one or more actions and executing the one or more actions for the objects identified by the application of the second series of logic and rules using its own internal logic and capabilities and based on the categorization information, wherein the categorization information is already determined or is assigned by the computing device of the intelligent service provider;
   wherein at least one of the intelligent service provider and the information management server identifies the service level objectives for the data objects identified by the application of one of the first or second series of logic and rules and orchestrates services for the identified data objects based on the service level objectives.

13. The system of claim 12, wherein the intelligent service provider is further capable of sending monitoring information to the information management system indicating whether the actions have been executed for the objects.

14. The system of claim 13, further comprising an adaptor capable translating the second series of logic and rules to a format understandable by the intelligent service provider.

15. The system of claim 12, further comprising an information management module capable of sending the second series of logic and rules to the intelligent service provider and receiving monitoring information from the intelligent service provider indicating whether the intelligent service provider has executed the actions for the objects.

16. The system of claim 15, further comprising an adaptor capable of translating the second series of logic and rules sent by the information management module from a second format to the first format and translating the monitoring information from the first format to the second format.

17. The system of claim 12, wherein the information management server is further capable of:
   identifying one or more service level objectives for each object based on the assigned one or more categories;
   mapping the one or more service level objectives to service levels available from service providers; and
   sending a series of logic and rules which pertain to the categorization of objects in the computer system and one or more actions to be executed to the objects based on the categorizations of the objects and the service levels available from service providers to the intelligent service provider.

18. The system of claim 12, wherein the intelligent service provider is capable of executing backup services, retention services, corporate compliance services, regulatory compliance, data accessibility, data deletion, access control, moving data objects to a tier of storage based on the lifecycle of the data objects, and disaster recovery.

19. The system of claim 12, wherein the first and second series of logic and rules pertain to categories of data objects and determining which data objects require the one or more actions comprises retrieving classification information for the data objects and applying the logic and rules pertaining to the categories of data objects to the classification information for the data objects.

20. The method as recited in claim 1, wherein one portion of the policy is performed with respect to a data object independent of any user action regarding that data object.

21. The method as recited in claim 6, wherein one portion of the policy is performed with respect to a data object independent of any user action regarding that data object.

\* \* \* \* \*